(12) United States Patent
Yang

(10) Patent No.: US 12,345,249 B1
(45) Date of Patent: Jul. 1, 2025

(54) VACUUM ADSORBER

(71) Applicant: Guixiang Yang, Dongguan (CN)

(72) Inventor: Guixiang Yang, Dongguan (CN)

( * ) Notice: Subject to any disclaimer, the term of this patent is extended or adjusted under 35 U.S.C. 154(b) by 0 days.

(21) Appl. No.: 19/012,852

(22) Filed: Jan. 8, 2025

(30) Foreign Application Priority Data

Nov. 25, 2024 (CN) .......................... 202422871007.2

(51) Int. Cl.
| | | |
|---|---|---|
| *F04B 45/04* | (2006.01) | |
| *B25B 11/00* | (2006.01) | |
| *B60R 11/00* | (2006.01) | |
| *B60R 11/02* | (2006.01) | |
| *F04B 49/06* | (2006.01) | |
| *F16B 47/00* | (2006.01) | |
| *F16M 11/04* | (2006.01) | |
| *F16M 11/10* | (2006.01) | |
| *F16M 13/00* | (2006.01) | |
| *F16M 13/02* | (2006.01) | |

(Continued)

(52) U.S. Cl.
CPC ............ *F04B 45/04* (2013.01); *B25B 11/005* (2013.01); *B25B 11/007* (2013.01); *B60R 11/0241* (2013.01); *F04B 49/06* (2013.01); *F16B 47/00* (2013.01); *F16M 11/041* (2013.01); *F16M 11/10* (2013.01); *F16M 13/00* (2013.01); *F16M 13/022* (2013.01); *G01C 15/004* (2013.01); *B60R 2011/0056* (2013.01); *H01H 13/14* (2013.01); *Y10S 294/907* (2013.01)

(58) Field of Classification Search
CPC ........ F04B 49/06; F16B 47/00; G01C 15/004; B25B 11/005; B25B 11/007; Y10S 294/907; F16M 13/022; F16M 11/041; F16M 11/10; F16M 13/00; B60R 11/0241; B60R 2011/0056

See application file for complete search history.

(56) References Cited

U.S. PATENT DOCUMENTS

| | | | | |
|---|---|---|---|---|
| 5,184,858 A | * | 2/1993 | Arai ..................... | B65G 49/061 294/185 |
| 5,795,001 A | * | 8/1998 | Burke .................. | B65G 49/061 294/185 |

(Continued)

FOREIGN PATENT DOCUMENTS

CA      2816627 A1      5/2012

*Primary Examiner* — Peter J Bertheaud
(74) *Attorney, Agent, or Firm* — Ricky Lam

(57) ABSTRACT

A vacuum adsorber includes a housing having an accommodating cavity and an opening communicating with the accommodating cavity; an integrated vacuum pump arranged inside the accommodating cavity; a control panel arranged inside the accommodating cavity and controllably connected with the integrated vacuum pump; wherein the control panel is controllably connected with a photoelectric switch; a power-up assembly having a guide piece and a shading movement portion; and an activating piece covering inside the opening of the housing. By means of setting the activating piece to push the shading movement portion to move in the movement cavity, when the shading movement portion moves to block beams, it causes the state of beams to change, and then voltage inside the photoelectric switch changes; when the control panel detects a change in voltage, it controls the pump to start operating; thereby improving the stability and reliability during starting the pump.

9 Claims, 6 Drawing Sheets

(51) Int. Cl.
*G01C 15/00* (2006.01)
*H01H 13/14* (2006.01)

(56) References Cited

U.S. PATENT DOCUMENTS

| | | | | |
|---|---|---|---|---|
| 6,382,574 | B1 * | 5/2002 | Pando | F16B 47/00 |
| | | | | 248/205.8 |
| 7,260,895 | B2 * | 8/2007 | Long | G01C 15/002 |
| | | | | 33/291 |
| 7,322,116 | B2 * | 1/2008 | Long | G01C 15/004 |
| | | | | 248/205.5 |
| 10,232,305 | B2 | 3/2019 | Gebald et al. | |
| 10,539,344 | B2 | 1/2020 | Takeuchi et al. | |
| 11,635,106 | B1 * | 4/2023 | Song | F16B 47/00 |
| | | | | 248/206.2 |
| 11,731,291 | B2 * | 8/2023 | Rotem | B25J 15/0616 |
| | | | | 294/183 |
| 12,031,819 | B2 * | 7/2024 | Yan | G01C 9/34 |

* cited by examiner

VACUUM ADSORBER

FIELD OF THE INVENTION

The present invention relates to the technical field of vacuum adsorbing devices, in particular to a vacuum adsorber.

BACKGROUND OF THE INVENTION

Most of traditional vacuum adsorbers are activated by setting contact points, but if the contact points are used for a long time, they may cause poor contact due to wear or contamination, which will affect the stability and reliability of power-up; in addition, if the contact resistance is too high due to roughness or material characteristics of contact surfaces at the time of switching on by way of contact points, it is possible to increase energy loss and reduce the stability and reliability of the vacuum adsorber.

SUMMARY OF THE INVENTION

In order to overcome the deficiencies in the prior art, the present invention presents a vacuum adsorber in embodiments.

The technical solution employed by the present invention to solve the above technical problem is as follows.

A vacuum adsorber includes:
  a housing having a hollow interior, which forms an accommodating cavity and an opening communicating with the accommodating cavity;
  an integrated vacuum pump arranged inside the accommodating cavity;
  a control panel arranged inside the accommodating cavity and controllably connected with the integrated vacuum pump; wherein the control panel is controllably connected with a photoelectric switch;
  a power-up assembly having a guide piece and a shading movement portion; wherein the guide piece is arranged inside the accommodating cavity and has a hollow interior forming a movement cavity, a cavity wall of which a light transmission opening leads through; wherein the shading movement portion is movably arranged inside the movement cavity; and
  an activating piece covering inside the opening of the housing and used to push the shading movement portion to move.

As a preferred technical solution of the present invention, at least part of a sensing end of the photoelectric switch penetrates out of the control panel and can be directed towards the light transmission opening.

As a preferred technical solution of the present invention, a stepwise end is arranged on the cavity wall of the movement cavity, and a protruding portion set against the stepwise end is arranged on an outer side wall of the shading movement portion.

As a preferred technical solution of the present invention, an elastic piece used to push the shading movement portion to move back to an original position is arranged inside the movement cavity.

As a preferred technical solution of the present invention, a first straight plane is formed on the cavity wall of the movement cavity, and a second straight plane used to fit on the first straight plane is formed on an outer side wall of the shading movement portion.

As a preferred technical solution of the present invention, a positioning plate is arranged inside the accommodating cavity, and the guide piece is detachably arranged on a side of the positioning plate.

As a preferred technical solution of the present invention, a positioning column is arranged on a side of the positioning plate, a fixing hole is set on the positioning column; a locking hole correspondingly communicating with the fixing hole leads through the guide piece;
  the vacuum adsorber also includes a locking piece, the locking piece simultaneously penetrates the locking hole and the fixing hole, so that the guide piece is fixed.

As a preferred technical solution of the present invention, the activating piece includes a cover plate covering inside the opening and a keycap arranged on a side of the cover plate far away from the accommodating cavity; the keycap is close to an inner side of the accommodating cavity and stays against the shading movement portion.

As a preferred technical solution of the present invention, the cover plate and the keycap are both of softness.

As a preferred technical solution of the present invention, the integrated vacuum pump is provided with an air inlet pipe; a through hole communicating with the air inlet pipe leads through the cavity wall of the accommodating cavity.

Compared with the prior art, the present invention has the following beneficial effects.

By means of an arrangement that the activating piece pushes the shading movement portion to move in the movement cavity, when the shading movement portion moves to block beams of light, the shading movement portion causes the state of beams to change as a consequence, and then voltage inside the photoelectric switch changes; when the control panel detects a change in voltage, it controls the integrated vacuum pump to start operating; accordingly, such arrangement improves the stability and reliability at the time of starting the integrated vacuum pump

BRIEF DESCRIPTION OF THE DRAWINGS

In order to more clearly describe the technical solution of the embodiments of the present invention, we shall briefly depict the figures that need to be used in the description of the embodiments, and it is obvious that the figures in the following description are involved in some embodiments of the present invention, but a person skilled in the art can obtain other figures according to these figures without giving creative work for them.

Figure 1:
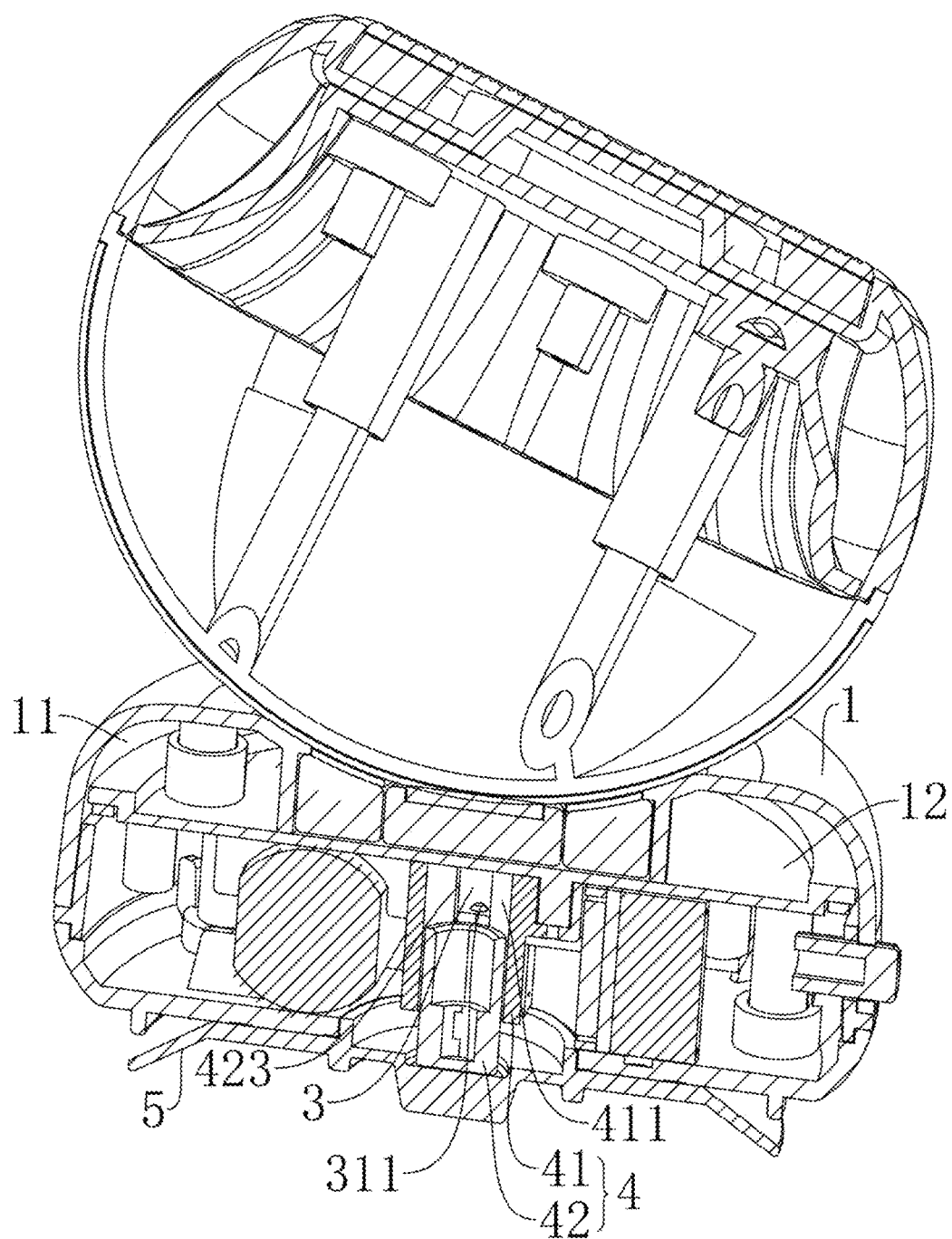
FIG. 1 is a structural cross-sectional view of one embodiment of the present invention.

With reference to the marks in the description.
  1—housing; 11—accommodating cavity; 12—positioning plate; 121—positioning column; 13—through hole; 14—opening; 2—integrated vacuum pump; 21—air inlet pipe; 3—control panel; 31—photoelectric switch; 311—sensing terminal; 4—power-up assembly; 41—guide piece; 411—movement cavity; 412—stepwise end; 413—first straight plane; 42—shading movement portion; 421—protruding portion; 422—second straight plane; 423—light transmission opening; 5—activating piece; 51—cover plate; 52—keycap.

DETAILED DESCRIPTION OF SOME EMBODIMENTS

In order to make the technical problem to be solved in the present invention, the technical solution and the beneficial effect more clearly understood, we shall further describe the present application in detail in combination with the figures and examples as follows.

It should be understood that the examples described herein are only used to interpret the present invention and are not intended to pose any limitation on the present invention.

It should be noted that when a member is said to be "fixed to" or "arranged on" another member, it can be directly or indirectly put on this another member.

When a member is said to be "connected" to another member, it can be directly or indirectly connected to this another member.

It is understandable that the directional or positional relation indicated by the directional words such as "length", "width", "up", "down", "front", "rear", "left", "right", "vertical", "horizontal", "top", "bottom", "interior" and "exterior" are usually based on the directional or positional relation shown in the figures, and are only for the convenience of describing the present invention and simplifying the description; but, these directional words do not indicate or imply that the devices or elements referred to must involve a specific direction or make their forms and operate in a particular direction; therefore, these directional words cannot be construed as limitations on the protection scope of the present invention.

In addition, the terms "first" and "second" are only used for description and should not be construed as a meaning of indicating or implying relative importance or implying the number of the technical feature referred to. Thus, the technical feature defined with the "first" and "second" may explicitly or implicitly include one or more of these features.

In the description of the present invention, "plurality" means two or more than two, unless otherwise specified.

In order to solve the technical problem in the prior art that the contact points applied in existing vacuum adsorbers easily affect the stability of power-up and result in reducing the stability and reliability at the time of starting a vacuum adsorber; therefore, the present invention presents a vacuum adsorber in embodiments.

We shall describe the embodiments of the present invention in detail as follows, which provide a specific structure of a vacuum adsorber; as shown in FIGS. 1-6, the specific structure of the vacuum adsorber includes a housing 1, an integrated vacuum pump 2, a control panel 3, a power-up assembly 4 and an activating piece 5.

The housing 1 has a hollow interior, which forms an accommodating cavity 11 and an opening 14 communicating with the accommodating cavity 11.

Specifically, the integrated vacuum pump 2, the control panel 3 and the power-up assembly 4 are all arranged inside the accommodating cavity 11; in this way, by means of an arrangement that the accommodating cavity 11 accommodates core members such as the integrated vacuum pump 2, the control panel 3 and the power-up assembly 4, it is possible to guarantee that they can operate in a enclosed and well-protected environment, so as to avoid damage caused by collisions between other external objects and these members, and that after arranging the activating peace 5 inside the opening 14, these members are enclosed in the same sealed accommodating cavity 11, so as to prevent external dust, moisture and other pollutants from entering the inside of the housing 1.

The integrated vacuum pump 2 is arranged inside the accommodating cavity 11. Specifically, in existing vacuum pumps, a motor is disposed separately from the vacuum pump, an eccentric wheel is arranged on the motor and the vacuum pump is driven by a piston rod; thus, the vacuum pump makes a vacuum by means of a piston; but in the integrated vacuum pump 2 of the embodiments of the present invention, an eccentric wheel device drives a diaphragm inside the pump to move back and forth, thereby compressing or stretching the air in the pump cavity to take a vacuum effect. Specifically, when the diaphragm moves inward, the air in the pump cavity is compressed, a deflation vent is opened and an inflation vent is closed, so that the air in the pump chamber is deflated, and when the diaphragm moves outward, a negative pressure is formed, the deflation vent is closed and the inflation vent is opened, so that the air in a suction cup is pumped into the pump cavity. As known from the above, it is possible to take effects such as no lubrication, less leakage, and stronger sealing by way of setting the diaphragm, and reduce the noise generated during operation.

The control panel 3 is arranged inside the accommodating cavity 11, and the control panel 3 is controllably connected with the integrated vacuum pump 2; the control panel 3 is controllably with a photoelectric switch 31.

Specifically, the control panel 3 acting as a core control member of the whole system, can receive and input signals, process a received signal according to a preset program or algorithm, and then output a control signal to drive the integrated vacuum pump 2. The photoelectric switch 31 is a non-contact sensor, which employs the photoelectric effect for operation; when the photoelectric switch 31 get sensed, it can send an electrical signal, which is received by the control panel, which finally output a high-level signal used for starting the operation of the integrated vacuum pump 2.

It should be additionally noted that a circuit and a processor on the control panel 3 can receive, process and analyze a received signal, and then output a corresponding control instruction, thereby realizing control to the integrated vacuum pump 2.

Figure 2:
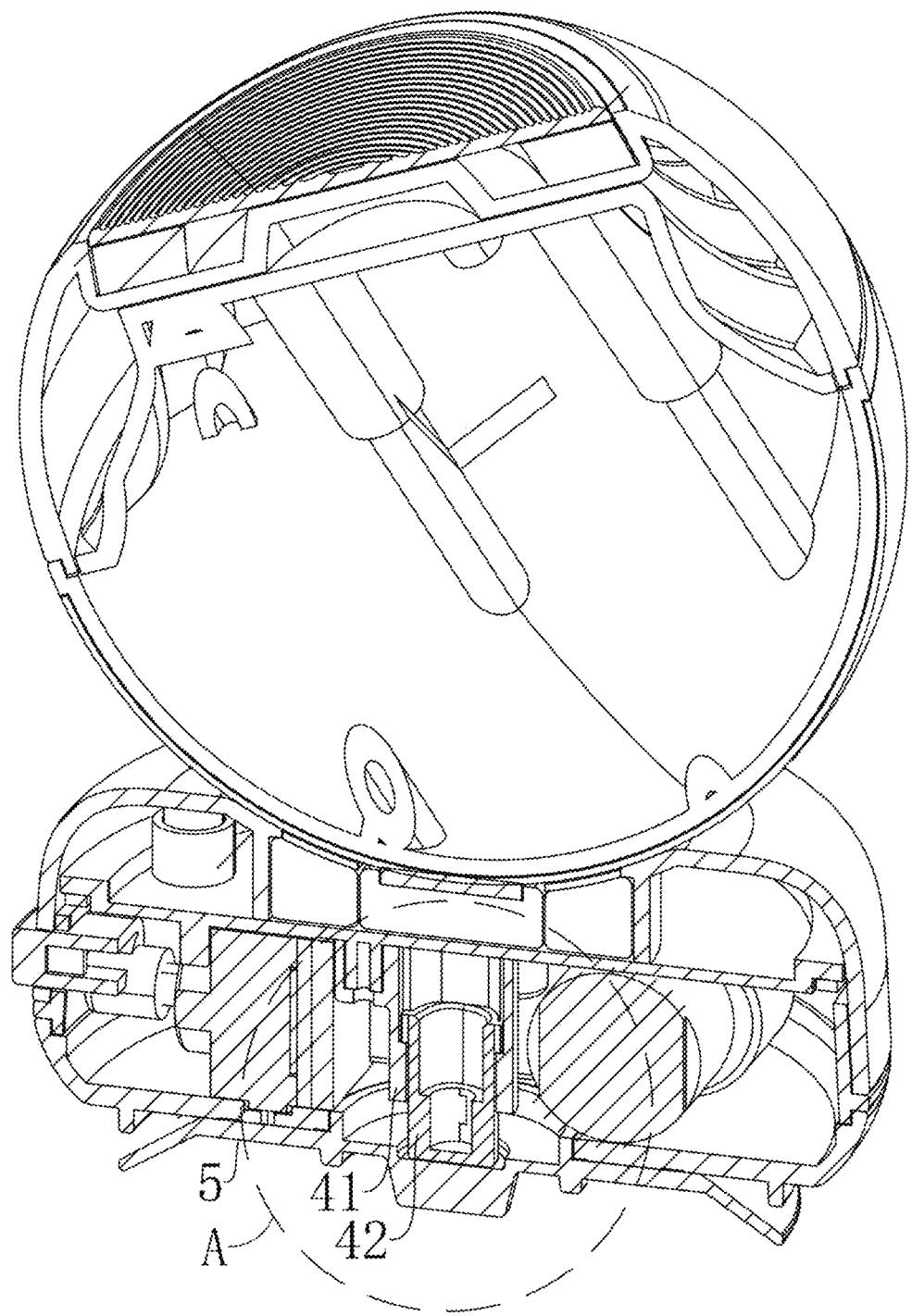
FIG. 2 is a structural cross-sectional view of another embodiment of the present invention.
Figure 3:
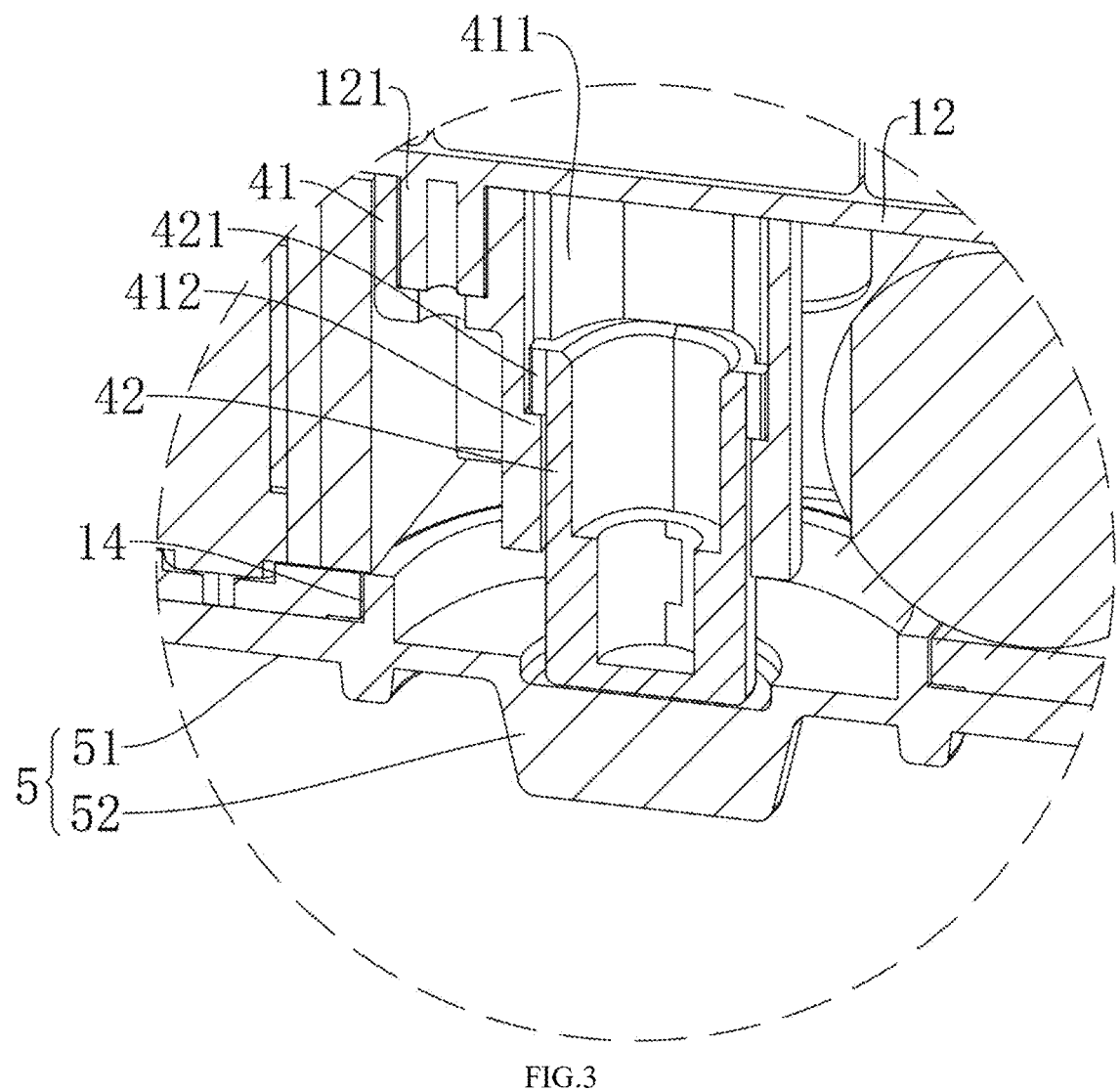
FIG. 3 is a partial enlarged view at A in FIG. 2.

As shown in FIGS. 1-3, the power-up assembly 4 has a guide piece 41 and a shading movement portion 42; the guide piece 41 is arranged inside the accommodating cavity 11 and has a hollow interior forming a movement cavity 411, a cavity wall of which a light transmission opening 423 leads through, the shading movement portion 42 is movably arranged inside the movement cavity 411.

Specifically, in order to enable the integrated vacuum pump 2 to start operating, the shading movement portion 42 is used to control the state of beams on the photoelectric switch; in particular, the activating piece 5 is used to push the shading movement portion 42 to move in the axial direction of the guide piece 41 inside the movement cavity 411; by means of an arrangement that the photoelectric switch 31 arranged on the control panel 3 includes a transmitting sensing terminal 311 and a receiving sensing terminal 311, and the light is kept stably beaming in a certain direction under certain conditions. When the shading movement portion 42 moves to block beams of light, the shading movement portion 42 causes the state of beams to change as a consequence, and then voltage inside the photoelectric switch changes; in case that the control panel 3 detects a change in a voltage signal, for example, a change in type and amplitude of the voltage signal, it immediately identifies and processes this signal; thus the control panel 3 can respond quickly, and finally control the operation of the integrated vacuum pump 2.

It should also be noted in addition to the above that the photoelectric switch is composed of a photoresistor (such as a photodiode), and it operates complying with the principle that when light beams on the photoresistor through the light transmission opening 423 of the movement cavity 411, the light cause a change in resistance values of the photoresistor; conversely, when a light-shielding baffle moves to an optical path that can block the photoelectric switch inside the movement cavity 411, the photoelectric switch 31 will not be able to receive beams of light, causing its resistance value to change, accordingly a change in voltage; finally instructions of the control panel 3 control the integrated vacuum pump 2 to start operating.

As shown in FIG. 1, the activating piece 5 covers inside the opening 14 of the housing 1, and is used to push the shading movement portion 42 to move.

Specifically, when users press the activating piece 5 by the way of directly using their fingers or other pieces that assist in pressing, the entire shading movement portion 42 is pushed to move to an optical path that can block the photoelectric switch inside the movement cavity 411 by means of the activating piece 5.

Figure 4:
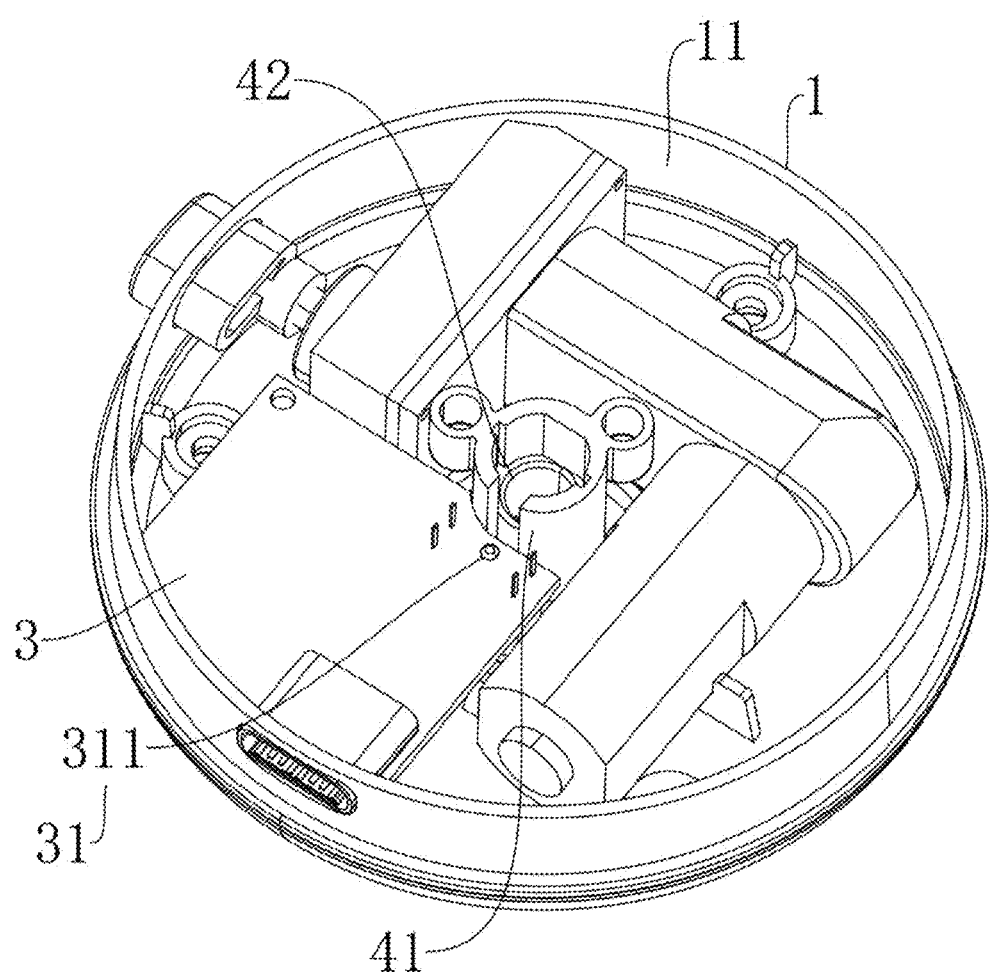
FIG. 4 is a structural diagram of the control panel and the power-up assembly of one embodiment of the present invention.

As shown in FIG. 4, in some specific embodiments, at least part of a sensing end 311 of the photoelectric switch 31 penetrates out of the control panel 3 and can be directed towards the light transmission opening 423.

Specifically, in order to raise a rate of utilizing internal space inside the accommodating cavity 11, a plurality of dodging holes lead through the control panel 3; thus, the sensing end 311 of the photoelectric switch 31 arranged on a side of the control panel 3 penetrates this dodging hole and is disposed out of the reverse side of the control panel 3 from its forward side; in this way, at least part of the sensing end 311 penetrates out of the reverse side of the control panel 3, so that a sensing direction of the sensing end 311 of the photoelectric switch 31 can be directed towards the light transmission opening 423. By means of such arrangement, it is possible to receive and transmit light signals from the light transmission opening 423 normally, realize accurately sensing and operating, and avoid the sensing end 311 from occupying additional space on the control panel 3, thereby raising a rate of utilizing internal space inside the accommodating cavity 11.

As shown in FIG. 3, in some specific embodiments, a stepwise end 412 is arranged on the cavity wall of the movement cavity 411, and a protruding portion 421 set against the stepwise end 412 is arranged on an outer side wall of the shading movement portion 42; thus, the protruding portion 421 is used to limit movement distance of the shading movement portion 42.

Specifically, the contact between the stepwise end 412 and the protruding portion 421 takes a limiting effect; in particular, on the season that the photoelectric switch 31 will not be able to receive light, causing its resistance value to change, when the shading movement portion 42 moves to the sensing end 311 of the photoelectric switch 31 to enable it to receive light, the protruding portion 421 of the shading movement portion 42 at this moment touches the stepwise end 412, and then prevents the shading movement portion 42 from continuing to move; in this way, the positional limitation arising from physical contact ensures that the shading movement portion 42 can only move within a predetermined range, and prevents the shading movement portion 42 from excessively deviating or falling off.

It is understandable that the aforesaid protruding portion 421 is several in number, for example, the protruding portion 421 is two in number, and a side of each protruding 421 is set slidably against the cavity wall of the movement cavity 411, so as to further improve the stability of the entire shading movement portion 42 when the movement cavity 411 moves.

As shown in FIGS. 2-3, in some specific embodiments, an elastic piece used to push the shading movement portion 42 to move back to an original position is arranged inside the movement cavity 411.

Specifically, when the elastic piece is a spring, in the absence of pressing the activating piece 5, the spring is pushing the shading movement portion 42 to move along the direction of the activating piece 5 in the process of returning its original shape until the shading movement portion 42 moves back to an original position that no longer blocks beams of light.

Figure 5:
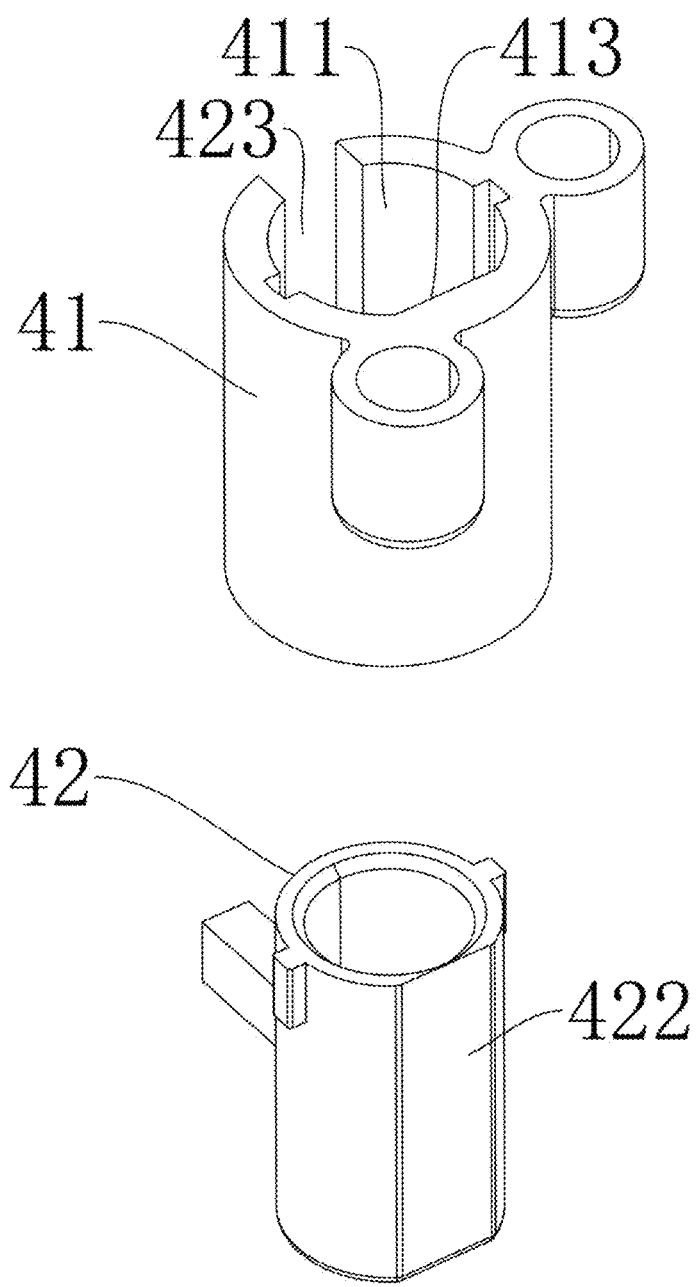
FIG. 5 is a structural diagram of the guide piece and the shading movement portion of one embodiment of the present invention.

As shown in FIG. 5, in some specific embodiments, a first straight plane 413 is formed on the cavity wall of the movement cavity 411, and a second straight plane 422 used to fit on the first straight plane 413 is formed on the outer side wall of the shading movement portion 42.

Specifically, if the movement cavity 411 is provides as a cylindrical cavity and the shading movement portion 42 is in a cylindrical shape, it is easy to cause the shading movement portion 42 to shake in a circumferential direction during moving; therefore, the first straight plane 413 of the movement cavity 411 and the second straight plane 422 of the shading movement portion 42 are formed by precise machining, so as to ensure precision of fitting on each other. When the shading movement portion 42 moves inside the movement cavity 411, that the second straight plane 422 closely fits on the first straight plane 413 effectively prevents the shading movement portion 42 from shaking in a circumferential direction, so as to avoid the radial and circumferential movement of the shading movement portion 42 in the cavity; in addition, that the second straight plane 422 fits on the first straight plane 413 helps to enhance the overall structural strength of the movement cavity 411, and when the shading movement portion 42 moves inside the movement cavity 411, the first straight plane 413 and the second straight plane 422 jointly bear a certain load.

As shown in FIG. 3, in some specific embodiments, a positioning plate 12 is arranged inside the accommodating cavity 11, and the guide piece 41 is detachably arranged on a side of the positioning plate 12.

Specifically, in order to improve the convenience of disassembling and assembling the guide piece 41 and simplify the process of maintaining, disassembling and assembling it, that is, on the need of replacing and repairing the guide piece 41, it is only necessary to disassemble and take out the guide piece 41 from the positioning plate 12.

As shown in FIG. 3, specifically, a positioning column 121 is arranged on a side of the positioning plate 12, a fixing hole is set on the positioning column 121; a locking hole correspondingly communicating with the fixing hole leads through the guide piece 41; the vacuum adsorber also includes a locking piece, the locking piece simultaneously penetrates the locking hole and the fixing hole, so that the guide piece 41 is fixed.

Specifically, in order to improve the convenience of disassembling and assembling the guide piece 41, it is only necessary to lead the locking hole on the guide piece 41 to the locking hole of the positioning column 121 correspondingly during assembling the guide piece 41, and then insert the locking piece into the locking hole and the fixing hole simultaneously, so that the guide piece 41 can be fixed on the positioning plate 12. By means of such arrangement, it is possible to improve the convenience of assembling the guide piece 41; on the contrary, it is only necessary to detach the locking piece from the fixing hole and the locking hole, and then directly take out the guide piece 41 during disassembling the guide piece 41.

It is understandable that the locking piece in the embodiments of the present invention is a threaded bolt, and the fixing hole and the locking hole are all threaded holes, so that a threaded connection forms between the thread of the threaded bolt and threads of two threaded holes, so that it is difficult to loosen and shed the threaded bolt; in this way, the guide piece 41 is fixedly assembled on the positioning plate 12, so as to improve the firmness of the two.

As shown in FIG. 3, in some specific embodiments, the activating piece 5 includes a cover plate 51 covering inside the opening 14 and a keycap 52 arranged on a side of the cover plate 51 far away from the accommodating cavity 11; the keycap 52 is close to an inner side of the accommodating cavity 11 and stays against the shading movement portion 42.

Specifically, the cover plate 51 is used to cover the part of the opening 14 and used to protect the internal members from the interference of external factors such as dust and moisture, and the protruding portion 421 of the keycap 52 is arranged on a side of the cover plate 51 far away from the accommodating cavity 11; therefore, the keycap 52 is squeezed towards the shading movement portion 42 at the time of pressing down the keycap 52; thus, in this process, an inner side of the keycap 52 is in contact with the shading movement portion 42; because the shading movement portion 42 is movably arranged inside the movement cavity 411, the position of the shading movement portion 42 changes with the operation to the keycap 52; therefore, when the keycap 52 is in contact with the shading movement portion 42, it is possible to push the entire shading movement portion 42 to move inside the movement cavity 411.

In order to enable the keycap 52 and the shading movement portion 42 to closely stay against each other, it is possible to respectively set a concave structure and a convex structure on the keycap 52 and the shading movement portion 42, so as to ensure that the keycap 52 can tightly fit on the shading movement 42 under pressure.

In a further embodiment, the cover plate 51 and the keycap 52 are both of softness. Specifically, when the keycap 52 is under a push and pressure, the cover plate 51 and the keycap 52 made of soft material may be deformed to a certain extent, so as to generate a driving force that can drive the shading movement portion 42 to move, so that the shading movement portion 42 can move inside the movement cavity 411; in addition, the cover plate 51 and the keycap 52 made of soft material have good elasticity, and when the pressure of pushing the keycap 52 disappears, the keycap 52 and the cover plate 51 can both recover to their original shapes, thereby realizing returning to their original positions.

It should be additionally noted that as the cover plate 51 and the keycap 52 made of soft material have good performance in shock absorption and cushioning, it can effectively absorb external shocks and impacts and reduce influence on internal members. When the keycap 52 is pushed and pressed, the soft rubber material of the cover plate 51 and the keycap 52 can aid in alleviating the impact force during pressing down the key, and reduce the damage to the internal members.

It is understandable that the cover plate 51 and the keycap 52 in the embodiments of the present invention are made of materials such as thermoplastic elastomer, thermoplastic polyurethane elastomer, methyl hexenyl silicone rubber or polyvinyl chloride, but no limitation is posed on their specific types.

Figure 6:
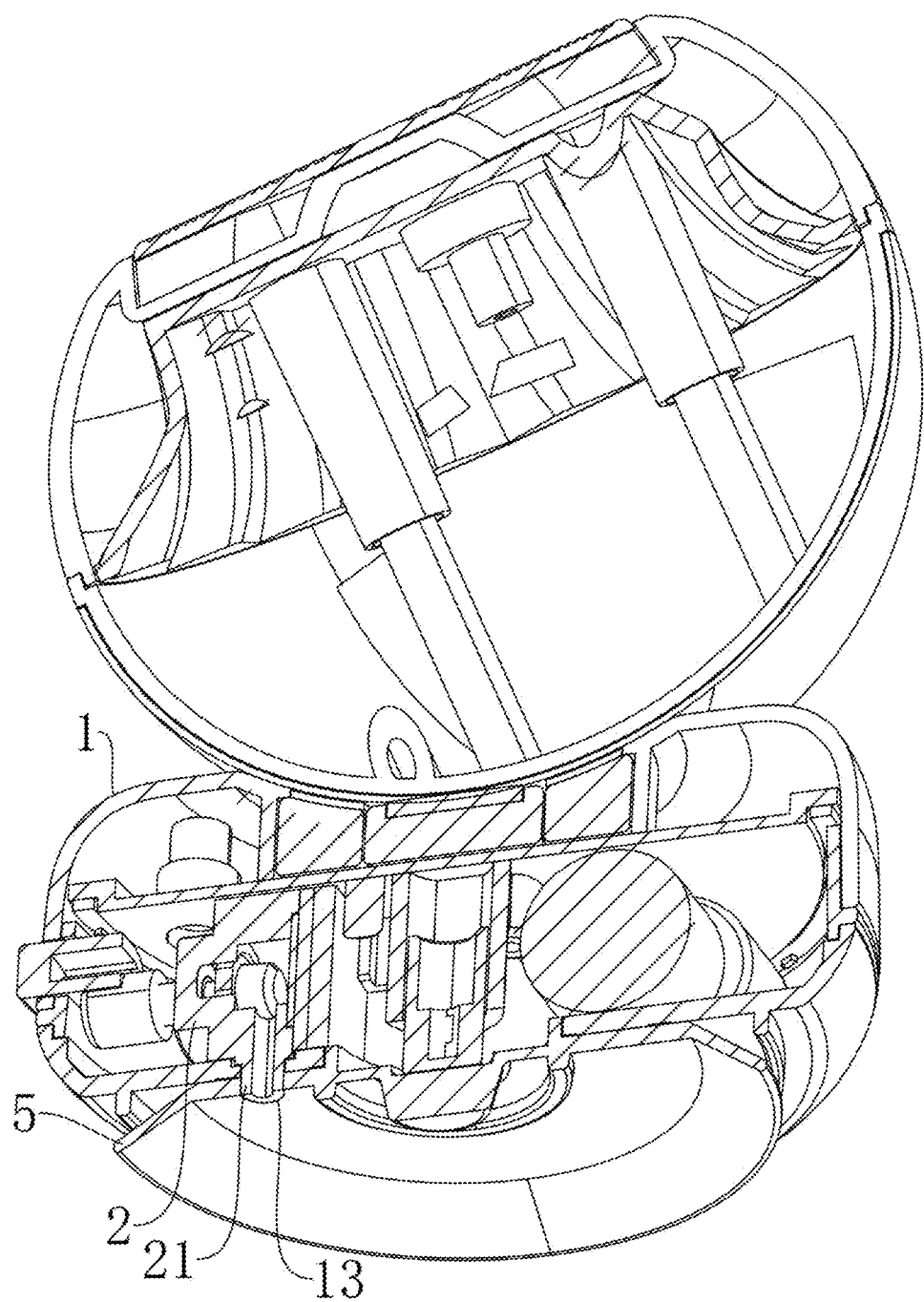
FIG. 6 is a structural cross-sectional view of another embodiment of the present invention.

As shown in FIG. 6, in some specific embodiments, the integrated vacuum pump 2 is provided with an air inlet pipe 21; a through hole 13 communicating with the air inlet pipe 21 leads through the cavity wall of the accommodating cavity 11. By means of such arrangement, the air inlet pipe 21 of the integrated vacuum pump 2 directly passes through the through hole 13 and communicates with peripherals, so as to avoid too many perforating holes between the two from causing more air leakage points, and further improve the overall sealing property.

Although embodiments of the present invention have been shown and described, they are not intended to pose any limitation on the present invention, it is understandable for a person killed in the art that a variety of changes, modifications, substitutions and variants may be made to these embodiments without departing from the principle and essence of the present invention, and they fall within the protection scope of the present invention. Therefore, the protection scope of the present invention should depend on the protection scope of the claims.

What is claimed is:

1. A vacuum adsorber comprising:
   a housing having a hollow interior, which forms an accommodating cavity and an opening communicating with said accommodating cavity;
   an integrated vacuum pump arranged inside said accommodating cavity;
   a control panel arranged inside said accommodating cavity and controllably connected with said integrated vacuum pump; wherein said control panel is controllably connected with a photoelectric switch;
   a power-up assembly having a guide piece and a shading movement portion; wherein said guide piece is arranged inside said accommodating cavity and has a hollow interior forming a movement cavity, a cavity wall of which a light transmission opening leads through; wherein said shading movement portion is movably arranged inside said movement cavity; and
   an activating piece covering inside the opening of said housing and used to push said shading movement portion to move;
   a stepwise end is arranged on the cavity wall of said movement cavity, and a protruding portion set against said stepwise end is arranged on an outer side wall of said shading movement portion.

2. The vacuum adsorber according to claim 1, wherein at least part of a sensing end of said photoelectric switch penetrates out of said control panel and can be directed towards said light transmission opening.

3. The vacuum adsorber according to claim 1, wherein an elastic piece used to push said shading movement portion to move back to an original position is arranged inside said movement cavity.

4. The vacuum adsorber according to claim 1, wherein a first straight plane is formed on the cavity wall of said movement cavity, and a second straight plane used to fit on said first straight plane is formed on an outer side wall of said shading movement portion.

5. The vacuum adsorber according to claim 1, wherein a positioning plate is arranged inside said accommodating cavity, and said guide piece is detachably arranged on a side of said positioning plate.

6. The vacuum adsorber according to claim 5, wherein a positioning column is arranged on a side of said positioning plate, a fixing hole is set on said positioning column; a locking hole correspondingly communicating with said fixing hole leads through said guide piece;

said vacuum adsorber also comprises a locking piece, said locking piece simultaneously penetrates said locking hole and said fixing hole, so that said guide piece is fixed.

7. The vacuum adsorber according to claim 1, wherein said activating piece includes a cover plate covering inside said opening and a keycap arranged on a side of said cover plate far away from said accommodating cavity; said keycap is close to an inner side of said accommodating cavity and stays against said shading movement portion.

8. The vacuum adsorber according to claim 7, wherein said cover plate and said keycap are both of softness.

9. The vacuum adsorber according to claim 1, wherein said integrated vacuum pump is provided with an air inlet pipe; a through hole communicating with said air inlet pipe leads through the cavity wall of said accommodating cavity.

\* \* \* \* \*